United States Patent [19]

Mauell

[11] 4,016,694

[45] Apr. 12, 1977

[54] SNAP-CONNECTABLE LATTICE ASSEMBLY FOR ELECTRICAL-CIRCUIT TILES

[76] Inventor: Helmut Mauell, Ansembourgallee 23, 562 Velbert, Germany

[22] Filed: June 12, 1975

[21] Appl. No.: 586,413

[30] Foreign Application Priority Data

June 12, 1974 Germany .......................... 2428291

[52] U.S. Cl. .................................. 52/475; 52/581; 52/663
[51] Int. Cl.² ...................................... H02B 15/04
[58] Field of Search .................... 52/126, 475–477, 52/581, 662, 663, 665

[56] References Cited

UNITED STATES PATENTS

| 3,295,272 | 1/1967 | Kanno | 52/126 |
|---|---|---|---|
| 3,425,179 | 2/1969 | Haroldson | 52/126 |
| 3,503,166 | 3/1970 | Nakazawa | 52/126 |
| 3,616,584 | 11/1971 | Sartori | 52/126 |
| 3,634,988 | 1/1972 | Schweitzer | 52/581 |
| 3,737,730 | 6/1973 | Manell | 52/581 |
| 3,877,189 | 4/1975 | Manell | 52/475 |
| 3,906,698 | 9/1975 | Oepping | 52/663 |

FOREIGN PATENTS OR APPLICATIONS

| 1,450,491 | 8/1966 | France | 52/126 |
|---|---|---|---|
| 1,577,362 | 8/1969 | France | 52/126 |
| 1,490,248 | 12/1968 | Germany | 52/126 |
| 422,284 | 4/1967 | Switzerland | 52/126 |
| 1,335,829 | 10/1973 | United Kingdom | 52/126 |

Primary Examiner—Price C. Faw, Jr.
Assistant Examiner—Henry Raduazo
Attorney, Agent, or Firm—Karl F. Ross; Herbert Dubno

[57] ABSTRACT

A lattice assembly for carrying tiles and electrical and electronic components comprises a plurality of star-shaped lattice elements each having a plurality of arms whose outer ends constitute connecting portions formed with downwardly extending arc-segmental tabs. These connection portions are connected together at anchors each formed with a central cylindrical upstanding abutment body adapted to engage snugly against the ends of a plurality of arms and formed with a plurality of arc-segmental recesses each adapted to receive a respective tab. In addition each connection portion is formed with a split pin having barbs and adapted to be received within sockets in the anchor so that the connection portions can be snap-fitted to the anchors. The elements are each provided at their central node with a spacer body having a height perpendicular to the plane of the element equal to half of the height similarly measured of the anchor so that two such groups of such elements can be mounted together back-to-back.

16 Claims, 4 Drawing Figures

SNAP-CONNECTABLE LATTICE ASSEMBLY FOR ELECTRICAL-CIRCUIT TILES

FIELD OF THE INVENTION

The present invention relates to a lattice assembly for mosaic tiles. More particularly this invention concerns such an assembly adapted to carry electrical circuit components, diagrams of electric circuitry and the like.

BACKGROUND OF THE INVENTION

Lattice assemblies are known for supporting electronic and electrical surface elements and mosaic tiles which either carry other circuit elements, are provided with circuit diagrams, or simply cover underlying wiring. Typically a plurality of closed polygonal or star-shaped lattice elements are secured by bolts to a plurality of anchors and the tiles are locked in place over top of the lattice elements. Either singly or together these lattice elements form a plurality of cells that are covered by the tiles. In most installations the assembly is meant to be free-standing so that two parallel planar groups of the lattice elements are spaced apart by the anchors and form a rigid erect assembly. It is also possible to screw the anchors to a support wall or floor and thereafter bolt the lattice elements onto these anchors.

In many such systems these connection portions on the ends of the arms or at the corners of the lattice elements overlie one other in a finished assembly. Thus fabrication is relatively difficult as these several lattice elements must be carefully positioned and then locking bolt inserted.

In other arrangements the lateral edges of the connection portions are beveled so as to fit together in a finished assembly. Thus it is possible to connect the arrangement together with the bolt overlapping the inner ends of all of the connection portions. Such arrangements frequently require an auxiliary holding device to be employed during the assembly. Furthermore once assembled the rigidity of many of these types or arrangements is inadequate until the tiles have been mounted in place.

Further such arrangements are described in German Pat. Nos. 1,195,846, 1,293,884, 1,490,248 and 2,060,777 and in Swiss Pat. Nos. 490,749 and 495,645, as well as in my U.S. Pat. Nos. 3,737,730 and 3,877,189.

OBJECTS OF THE INVENTION

It is an object of the present invention to provide an improved lattice assembly of the general type described in the above-listed patents.

Another object of this invention is to provide such an assembly which has only two different kinds of parts, excluding the tiles.

Yet another object is the provision of such an assembly which can quickly and easily be snapped together.

SUMMARY OF THE INVENTION

These objects are attained according to the present invention in an arrangement wherein the connection portions are each formed with laterally projecting noses or tabs that engage in correspondingly shaped recesses in the anchors. In addition each of the connection portions has an outwardly directed support surface which engages a correspondingly shaped abutment body unitarily formed on the anchor. Further means is provided unitarily formed on the lattice element and the anchor for securing these two together snap-fashion.

Thus with a system according to the present invention an extremely rigid assembly is obtained due to the snug fit of the tabs in the recesses of the anchor. Furthermore an attachment bolt is unnecessary as the entire arrangement can be snapped snugly together piece-by-piece for rapid and easy assembly.

According to another feature of this invention the abutment surface on each connection portion is part-cylindrical and the abutment body formed on the anchor is fully cylindrical so that a plurality of such abutment surfaces may press against it at angularly offset and equispaced locations. In addition the tab is formed at the abutment surface so that the outer face of the tab is similarly part cylindrical, with the same radius of curvature and the tab itself is formed as an arc-segmental extension perpendicular to the plane of the respective lattice element. In this case the anchor is formed with three or four arc-segmental recesses spaced about the abutment body and each adapted to receive respective tab. Small web are provided separating these recesses from one another so that proper angular positioning of the lattice elements is ensured.

Thus in accordance with the present invention the distance between each of the abutment surfaces of each connection portion and the corresponding opposite abutment surface of each lattice element determines the grid size of the lattice assembly. Tensions and stresses in the assembly will be absorbed directly at these tabs in the anchors so that an extremely strong construction is provided. Stresses in one direction will force the outside face of the tab against the corresponding face of the recess and forces in the opposite direction will be effective on the opposite face of the tab so that equal strength is achieved for any type of stress. It is possible with conventional techiques to form these elements and anchors of synthetic-resin material at extremely low coast and with a high degree of accuracy.

In accordance with another feature of this invention the snap connection between each connection portion and the corresponding anchor is achieved by providing a split barbed pin on the lattice element which is engageable within a recess or socket on the anchor. This socket has formations in the shape of a cutout which the barb formation on the pin can engage. Thus the pin of each connection portion need merely be pressed into the corresponding socket to lock this connection portion to the appropriate location on the anchor. No separate connecting bolt and correspondingly threaded hole need be provided. This leaves the center of each anchor free for attachment of other objects, such as circuit element which need to be heavily secured to the assembly.

According to a further feature of the present invention each of these lattice elements is generally star-shaped, having a central node from which extends a plurality of arms each of whose ends constitutes a connection portion. Each element is provided at its node with a spacer body having a height perpendicular to the plane of the element which is equal to half of the height of the corresponding anchors. When such a lattice element is used in an arrangement wherein each anchor is fitted at both of its ends with a plurality of connection portions, so that the spacer bodies at the nodes of the elements lie against one another inside the assembly, each cell will be supported at all of its corners. Furthermore these spacer bodies are provided according to this invention with centering elements which engage in corresponding formation on the opposite spacer bodies so that the assembly is made even more rigid. In such an arrangement it has been found advantageous to use a grid size of 24 or 48 mm. When the 24-mm size is used it is possible to eliminate a lattice element entirely so as to set into its place a meter or other circuit element that is 48 mm on a side, a conventional size. With such an arrangement it is possible to employ an anchor which, rather than the normal X-shaped or cruciform section, is of T section, or simply straight.

BRIEF DESCRIPTION OF THE DRAWING

The above and other objects, features, and advantages will become more readily apparent from the following, reference being made to the accompanying drawing in which.

SPECIFIC DESCRIPTION

Figure 2:
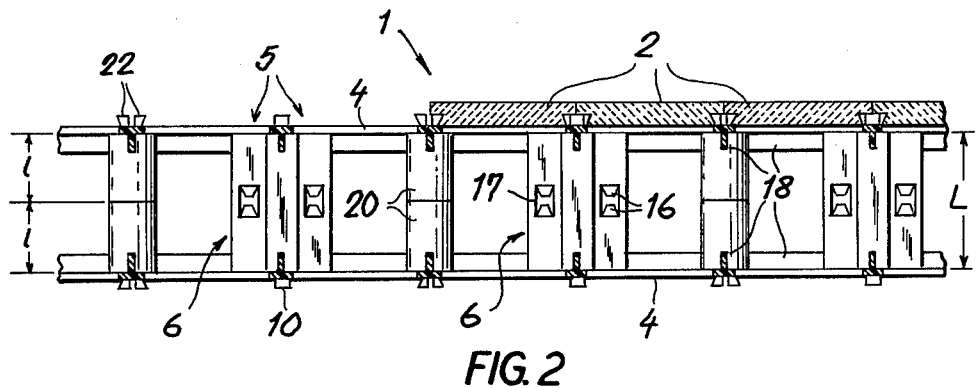
FIG. 2 is a side view of the arrangement of FIG. 1.
Figure 1:
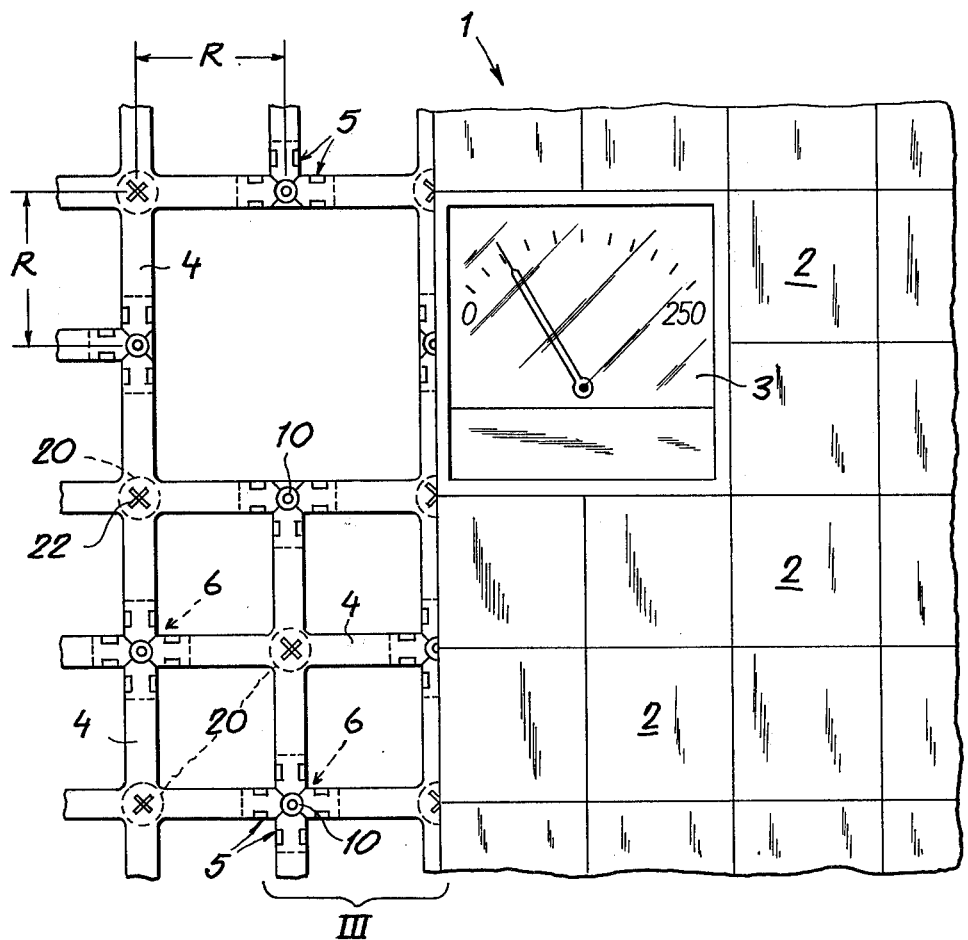
FIG. 1 is a top view of an arrangement according to the present invention with some of the tiles removed for clarity.

The arrangement shown in FIGS. 1 and 2 comprises a cellular mounting wall 1 on which are secured ceramic mosaic stones or tiles 2 or, instead of such tiles 2, an electronic control instrument 3, hereinafter described as a meter. The wall 1 is formed of synthetic-resin cell or lattice elements 4 having ends or connection portions 5 connected to joining elements or anchors 6. It also lies within the scope of this invention to secure these lattice elements 4 directly against a support surface.

The connecting ends 5 of the lattice elements 4 are generally plainer and formed with inwardly extending noses or tabs 7 which are recieved in corresponding recess 9 in the connector elements 6. In addition each of these ends terminating in a circularly concave abutment surface 8 adapted to lie against a cylindrical center portion 10 of the element 6. Thus it can be seen that the entire assembly is made up of a plurality of indentical lattice elements 4 interconnected at identical anchors 6.

Figure 4:
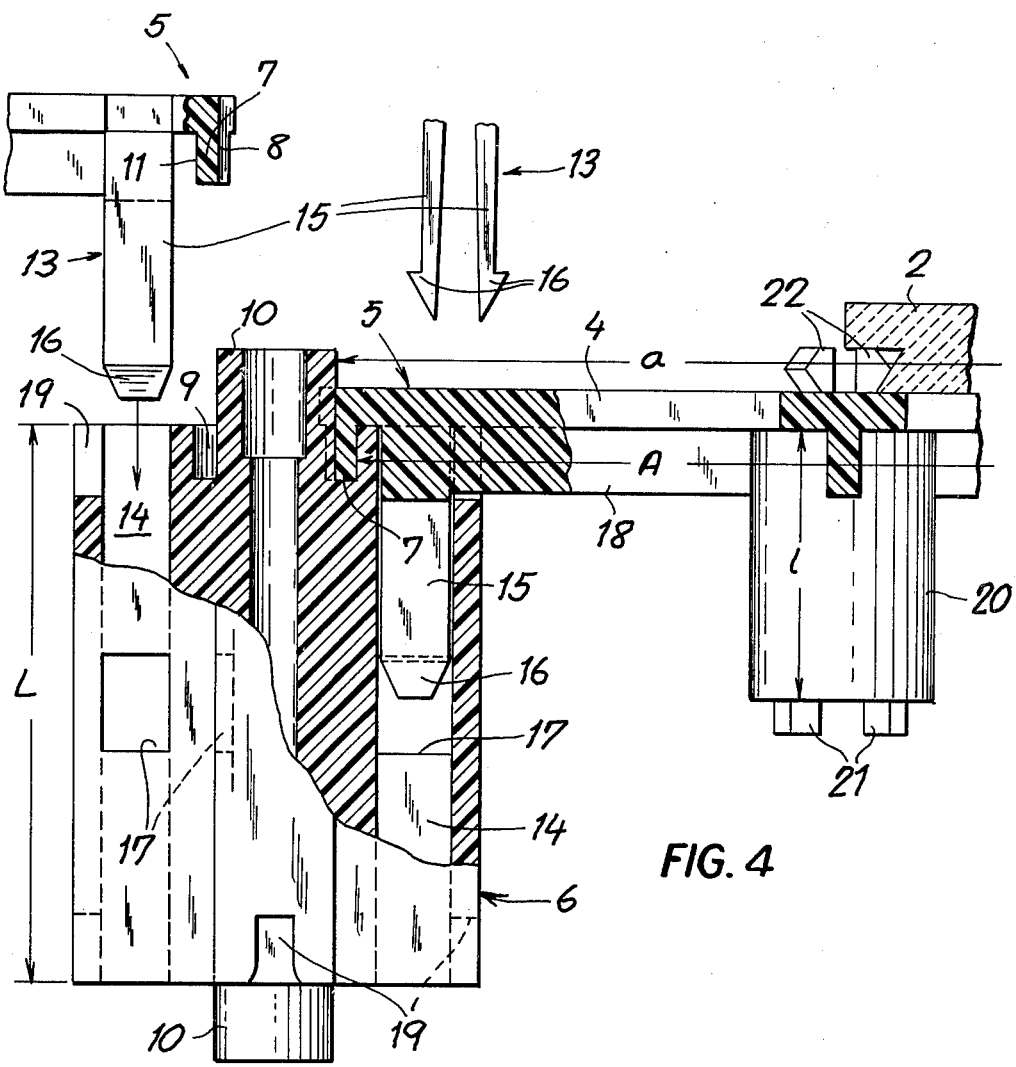
FIG. 4 is a section taken along line IV—IV of FIG. 3.
Figure 3:
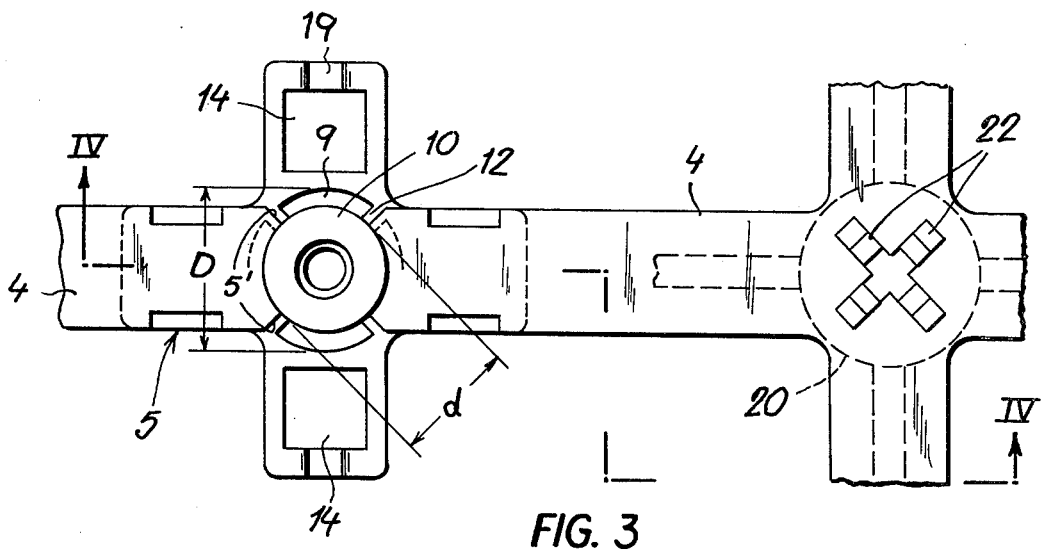
FIG. 3 is a large-scale view of the detail indicated at III of FIG. 1.

As shown in greater detail in FIGS. 3 and 4 each of the noses 7 has opposite its surface 8 and inner surface 11 which is similarly part-cylindrical. The outer and inner surfaces 8 and 11 of the nose 7 have the same radii of curvature as the inner and outer surfaces of the four concentric grooves 9 receiving these noses 7. These grooves 9 are separated by webs 12 unitary with the body of the connector element 6.

Thus in accordance with the present invention any forces exerted on any of the lattice elements 4 or connector 6 in the direction of the plane of the wall or of these lattice elements will be completely taken up by the respective noses 7 received in their respective grooves 9. A distance A from the inside of one nose 7 to the inside surface 11 of the opposite nose 7 added to the outer diameter D of the groove 9 is equal to the grid spacing R of the arrangement according to the present invention. This is also equal to the distance $a$ between the surface 8 of each nose 7 and the corresponding surface 8 of the opposite nos and the diameter $d/d$ of the inside of groove 9.

With the system according to the present invention any forces exerted on either the connector elements 6 or the lattice elements 4 in the plane of these elements 4, which is also the plane of the wall formed thereby, are completely taken up by the noses 7 in their grooves 9. Similarly if any of these lattice elements 4 is pressed inwardly it will not be dislodged due to the fitting of the nose 7 within the groove 9.

In addition according to this invention each of the ends 5 is provided with a locking pin 13 adapted to be received within a corresponding socket or passage 14 in the connector elements 6. Thus it is not necessary to provide separate connecting screws for securing these lattice elements 4 on connector elements 6. These pins 13 are of square overall section and are split into two side portions 15 each provided with outwardly extending barb 16 that engages in an outwardly open recess 17 in the holes 14. Thus, once the barbs 16 engage in these holes 17, the elements 4 are locked onto the connectors 6 and removal is only possible by pressing the barbs 16 both back inwardly while applying outward pressure on the corresponding end section 5.

Each of the lattice elements 4 is formed on each of its arms 5 with a longitudinally extending rib 18 received in a corresponding groove 19 in the connector element. This rib 18 reinforces the lattice element 4 and its fit within the groove 19 further stabilizes the assembly.

Each lattice element 4 is also provided at the node between its arms 5 with a spacer 20 which extends inwardly perpendicular to the plane of the lattice element 4 and has an overall length $l$ which is equal to half of the length L in the same direction of the connector elements 6. In addition these spacers 20 for the lattice elements are provided with centering formations 21 so that the spacers 20 are connectable to corresponding lattice elements 4 by means of these centering elements 21 in snap-fashion.

The assembly as shown is dimensioned so that the distance R equals 24 mm. The meter 3 shown in FIG. 1 therefore measures of 48 mm on side and takes the place of a single lattice element 4. The noses 7 are received in individual segments of the groove 9 so that even with this lattice element 4 missing the assembly is rigid and does not tend to slip apart.

FIGS. 3 and 4 further indicate how the tiles 7, formed as described in my U.S. Pat. Nos. 3,737,730 and 3,977,189 issued June 5, 1973 and Apr. 15, 1975, respectively, are engaged at the upstanding central portions 10 of the connector elements 6 and under tongues 22 on the spacers 20. The lattice elements 4 as well as the connector elements 4 and the spacer bodies 8 are all made of synthetic resin material, a durable polyamide such as Nylon being ideal.

It is noted that the angle defined between the abutment surfaces 5' of the connector region 5 at the end of the arm of the lattice element lie at angles of 90° to each other, so that the arc length of the circularly arcuate surface 8 is also 90°. The arc length of the tongue 7 is, however, slightly less than 90° by a distance equal to the arc length of the web 12, here approximately 10°. In this manner the tongue 7 fits tightly within its respective groove 9 whereas the flat abutment surfaces 5' of each lattice element fits snuggly against the corresponding surfaces of the adjacent connector portion 5.

I claim:
1. A lattice assembly comprising:
a plurality of generally planar rigid cellforming lattice elements each having a connection portion formed with an outwardly directed support surface and with a tab projecting laterally from the plane of the respective element, connection portions of adjacent lattice elements meeting at corners of the cells;

a plurality of anchors each at a respective corner and each formed with a plurality of recesses each shaped to snugly receive a respective tab and with an upstanding abutment body adapted to snugly engage a respective support surface on engagement of the respective tab in the respective recess;

means for securing each of said portins to a respective anchor with the respective surface snugly engaging the respective abutment body and the respective tab snugly received in the respective recess, said means including resiliently deflectable barbed projections on each of said lattice elements and respective sockets in each of said anchors releasably receiving a respective barbed projection; and a plurality of mosaic tiles of polygonal outline secured to said elements and anchors and each covering a respective cell.

2. The assembly defined in claim 1 wherein each of said tabs is formed as a segment of a cylindrical anulur.

3. The assembly defined in claim 2 wherein each of said supporting surfaces is part cylindrical.

4. The assembly defined in claim 3 wherein each of said tabs has an outer surface continuous with the respective support surfaces.

5. The assembly defined in claim 4 wherein each of said recesses has the shape of a segment of a cylindrically annular groove.

6. The assembly defined in claim 5 wherein said recesses are all concentric and angularly offset from one another.

7. The assembly defined in claim 6 wherein each support body is unitrarily formed with the respective anchor and has an outer cylindrical surface engageable with said support surfaces.

8. The assembly defined in claim 1 wherein each of said lattice elements is formed with laterally projecting ribs reinforcing the respective connection portions, each anchor being formed with respective notches receiving the respective ribs.

9. The assembly defined in claim 1 wherein each of said lattice elements has a central node and a plurality of arms extending from said node and having outer ends forming said connection portions, each of said arms being formed with a longitudinally extending reinforcing rib, said spacer body being elongated perpendicular to the respective plane and being formed in its longitudinal ends with notches receiving said ribs.

10. The assembly defined in claim 1 wherein said lattice elements and anchors are made of synthetic-resin material.

11. The assembly defined in claim 1 wherein each of said lattice elements has a central node and a plurality of arms extending from said node and each having an outer end constituting a respective connecting portion, each lattice element being provided at said node with a laterally projecting spacer body of predetermined height perpendicular to the plane of said element.

12. A lattice assembly comprising:

a plurality of generally planar rigid cellforming lattice elements each having a connection portion formed with an outwardly directed support surface and with a tab projecting laterally from the plane of the respective element, connection portions of adjacent lattice elements meeting at corners of the cells;

a plurality of anchors each at a respective corner and each formed with a plurality of recesses each shaped to snugly receive a respective tab and with an upstanding abutment body adapted to snugly engage a respective support surface on engagement of the respective tab in the respective recess; and a plurality of mosaic tiles of polygonal outline secured to said elements and anchors and each of each covering a respective cell, each of said tabs being formed as a segment of a cylindrical annulus, each of said supporting surfaces being part cylindrical, each of said tabs having an outer surface continuous with the respective support surfaces, each of said recesses having the shape of a segment of a cylindrically annular groove, all of said recesses being concentric and angularly offset from one another, each support body being unitarily formed with the respective anchor and having an outer cylindrical surface engageable with said support surfaces, said means including a laterally- -projecting pin formed on each connection portion and a socket shaped to snugly receive said pin formed on the respective anchor.

13. The assembly defined in claim 11 wherein said pin is longitudinally split and is formed with at least one laterally entending barb, each anchor being formed at the respective socket with a formation lockingly engageable with said barb.

14. A lattice assembly comprising:

a plurality of generally planar rigid cell- -forming lattice elements each having a connection portion formed with an outwardly directed support surface and with a tab projecting laterally from the plane of the respective element, connection portions of adjacent lattice elements meeting at corners of the cells;

a plurality of anchors each at a respective corner and each formed with a plurality of recesses each shaped to snugly receive a respective tab and with an upstanding abutment body adapted to snugly engage a respective support surface on engagement of the respective tab in the respective recess;

means for securing each of said portions to a respective anchor with the respective surface snugly engaging the respective abutment body and the respective tab snugly received in the respective recess; and a plurality of mosaic tiles of polygonal outline secured to said elements and anchors and each covering a respective cell, each of said lattice elements having a central node and a plurality of arms extending from said node and each having an outer end constituting a respective connecting portion, each lattice element being provided at said node with a laterally projecting spacer body of predetermined height perpendicular to the plane of said element, each of said anchors having a height perpendicular to the respective plane and equal to substantially twice said predetermined height of said spacer body.

15. The assembly defined in claim 14 wherein each of said spacer bodies is provided with centering elements engageable in another such spacer body.

16. A lattice assembly comprising:

a plurality of generally planar rigid cell-forming lattice elements of synthetic-resin material and each having a centeral node and a plurality of arms extending outwardly from said node and each having an outer end constituting a connection portion formed with an outwardly directed part-cylindrical support surface and with a laterally-projecting cylindrically angularly arcuate tab, said connection portions meeting at corners of the cells, a laterally projecting pin formed on each of said connection portions;

a plurality of synthetic-resin anchors each at a respective corner and each formed with a plurality of cylindrically annularly arcuate recesses each shaped to snugly receive a respective tab and with a cylindrical upstanding abutment body having an outer surface adapted to snugly engage a respective support surface on engagement of the respective tab in the respective recess, each of said anchors being formed with a respective socket, each pin being snugly receivable in the respective socket on engagement of the respective tab in the respective recess;

a barb formed on each of said pins, each of said sockets having a formation lockingly engageable with said barb on engagement with a respective pin in a respective socket; and a plurality of mosaic piles of polygonal outline each secured to said elements and said anchors and each covering a respective cell.

* * * * *